April 9, 1946.  G. FREEMAN  2,398,139
APPARATUS FOR CHECKING GEAR WHEELS
Filed Aug. 4, 1943  3 Sheets-Sheet 1
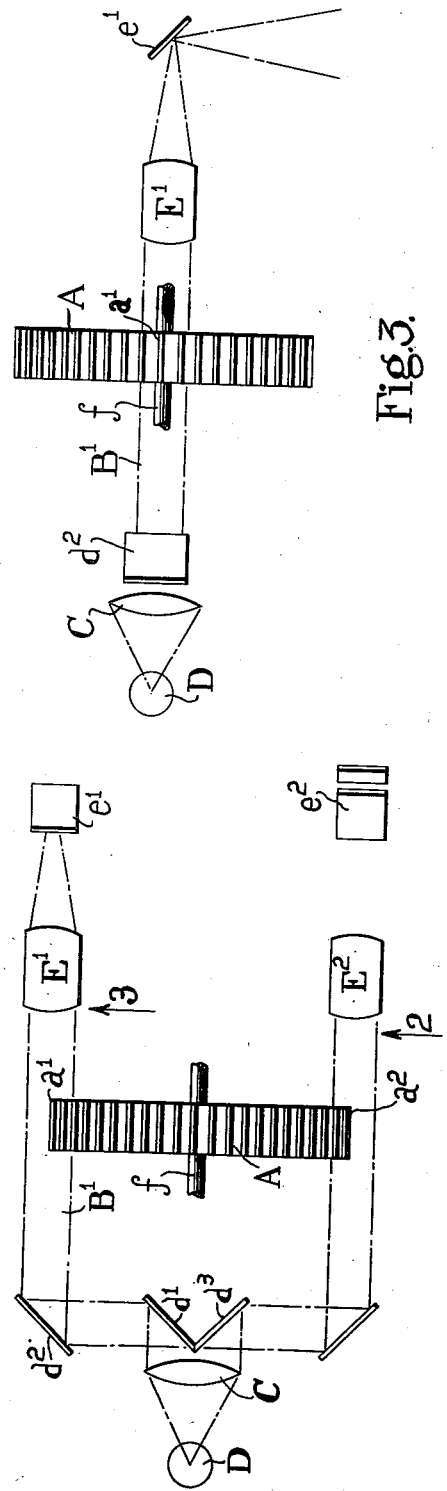
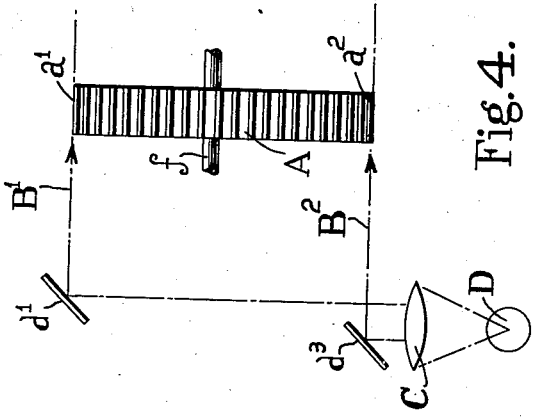
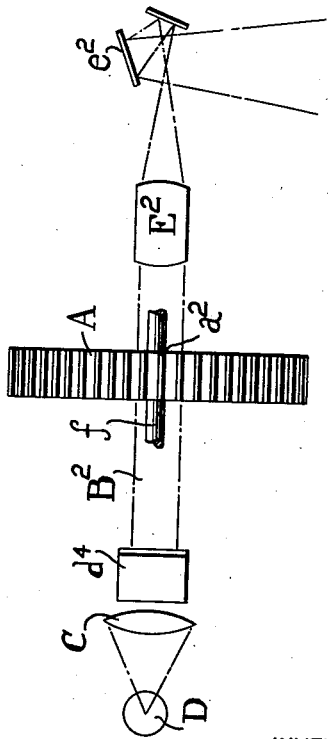
INVENTOR
GEORGE FREEMAN
BY
ATTORNEYS INVENTOR
George Freeman
By Norris & Bateman
ATTORNEYS

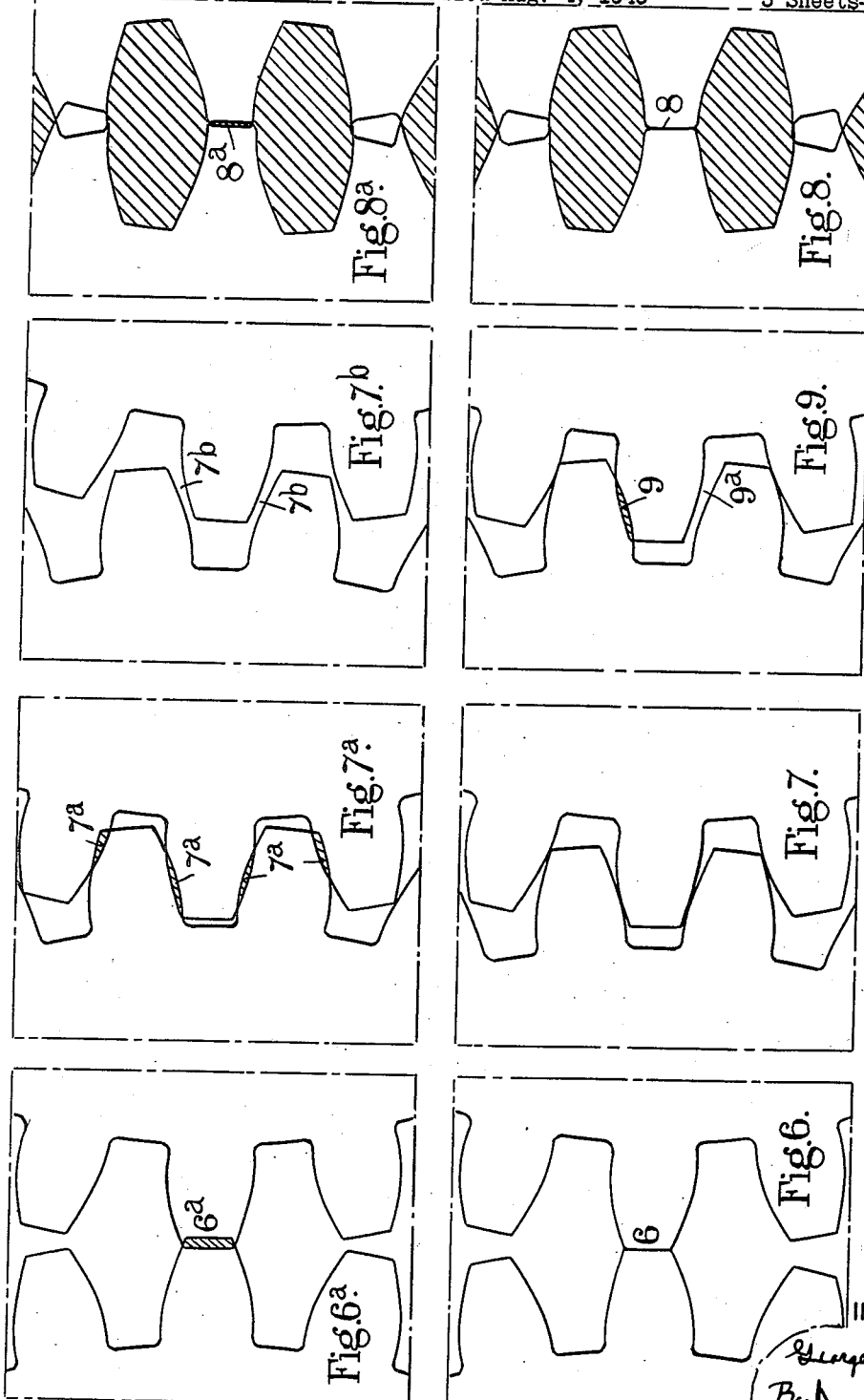

Patented Apr. 9, 1946

2,398,139

UNITED STATES PATENT OFFICE 2,398,139

APPARATUS FOR CHECKING GEAR WHEELS

George Freeman, Bolton, England

Application August 4, 1943, Serial No. 497,388
In Great Britain September 5, 1942

7 Claims. (Cl. 88—24)

This invention relates to an improved method of examining and checking the concentricity or amount of eccentricity of an object and to apparatus for carrying it out.

According to the invention the images of two sections of the object are projected by optical means side by side onto a screen, the optical systems being such that should the concentricity be correct the edges of the images of the two sections will be in contact but should there be eccentricity the edges of the two images will either be spaced apart or overlap.

Although not limited to such use, the invention is particularly applicable for examining and testing the teeth of spur and other gears in which case the profile images of two non-adjacent teeth of the gear are projected by optical means side by side onto the screen so that the images of the teeth are in mesh, have their outer faces in contact or their root faces in contact according as to which part of the tooth it is desired to check and examine.

When the images of the teeth are projected so that they mesh any error in effective diameter will be indicated either by overlapping of the engaging faces of the teeth or by gaps between them according as to whether the effective diameter is too large or too small. Pitch errors will also be indicated by overlapping and clearance.

When the images of the teeth are projected so that the faces should appear in contact, errors in the outside diameter are indicated by overlapping or by non-contact of the faces and similarly when the images of the teeth are projected so that the roots should appear in contact, errors in the inside diameter are indicated by overlapping or by non-contact of the roots.

In carrying out the invention as applied, the gear wheel or other object is mounted in bearings so that it can be rotated a small angular distance (in the case of a gear wheel a single tooth) at a time and two parallel beams of light are caused to fall onto two sections of the periphery of the object and each beam is then projected onto a screen by a projecting lens and series of reflecting surfaces so that the images of the two sections appear side by side on the screen. The reflecting surfaces may be arranged between the object and the projecting lens in which case only a single projecting lens is necessary or the projecting lens may be between the object and the reflecting surfaces in which case two projecting lenses—one for each beam—are required.

For checking gear wheels it is necessary to introduce an additional reflecting surface into one of the systems otherwise the images on the screen would rotate in the same direction, i. e. the teeth would appear to move in opposite directions as the wheel was moved and the images of the teeth would not therefore remain in mesh.

The invention will be described with reference to the accompanying drawings which illustrate diagrammatically several of its embodiments for checking and examining spur gear wheels.

In these drawings:

Fig. 1 is a diagrammatic view of one arrangement of lenses and reflecting surfaces.

Fig. 2 is a view looking in the direction of arrow 2 of Fig. 1.

Fig. 3 is a view looking in the direction of arrow 3 of Fig. 1.

Fig. 4 is a diagrammatic view showing a different arrangement of condenser lens and reflecting surfaces for obtaining the two parallel beams.

Figs. 6 to 11 illustrate the resulting images obtained on the screen when testing the outside diameter, the pitch diameter, the root diameter and the pitch of the wheel. In Figs. 6 to 9 the projected images are of two diametrically opposite portions of the wheel.

Fig. 6 shows the resulting images when the outside diameter is correct and Fig. 6$^a$ when the outside diameter is too large.

Fig. 7 shows the resulting images when the pitch diameter is correct, Fig. 7$^a$ when it is too large and Fig. 7$^b$ when it is too small.

Fig. 8 shows the resulting images when the root diameter is correct and Fig. 8$^a$ when it is too large.

Fig. 9 shows the resulting images when there is a pitch error.

Figs. 10 and 11 show the method when images of two more or less adjacent portions of the wheel are projected, Fig. 10, showing the two portions of the wheel and Fig. 11 the resulting images when testing for corrections of pitch diameter.

In the arrangement illustrated in Figs. 1 to 3 the gear wheel A is mounted in bearings in which it can be rotated tooth by tooth. A lamp D carried in a suitable housing is located behind the wheel and a condenser lens C is arranged in the outlet aperture from the housing. Two systems of reflecting surfaces $d^1$, $d^2$ and $d^3$, $d^4$ are arranged in front of the condenser lens C to divide the light after passing through the lens and reflect it as two parallel beams $B^1$, $B^2$ onto two diametrically opposite peripheral portions $a^1$, $a^2$ of the periphery of the wheel. A projection lens $E^1$ or $E^2$ is arranged in the path of the beams $B^1$, $B^2$ respectively. The image projected by the lens $E^1$ is reflected by the system or reflecting surfaces $e^1$ onto a screen and the image projected by the lens $E^2$ is similarly reflected by the system of reflecting surfaces $e^2$ onto the same screen the two images being side by side and reversed in position in relation to the position on the wheel of two peripheral portions $a^1$, $a^2$.

In the arrangement illustrated in Fig. 4 the lamp D and condenser lens C are arranged at the side of the wheel A instead of behind the parallel beams $B^1$ and $B^2$ being reflected by the reflecting surfaces $d^1$ and $d^3$ respectively on the two diametrically opposite portions $a^1$, $a^2$ of the wheel A and thence to the projector lens $E^1$, $E^2$ as in Figs. 1 to 3.

Figure 10:
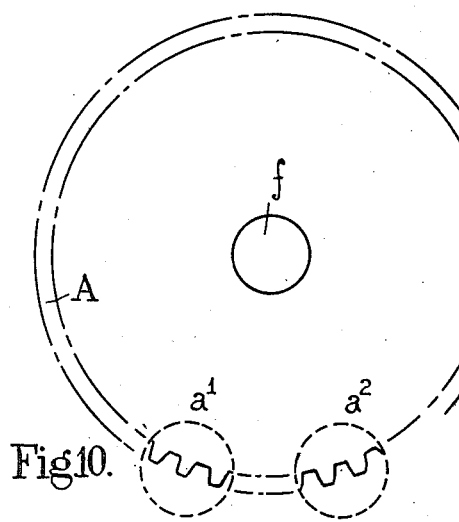
Figure 11:
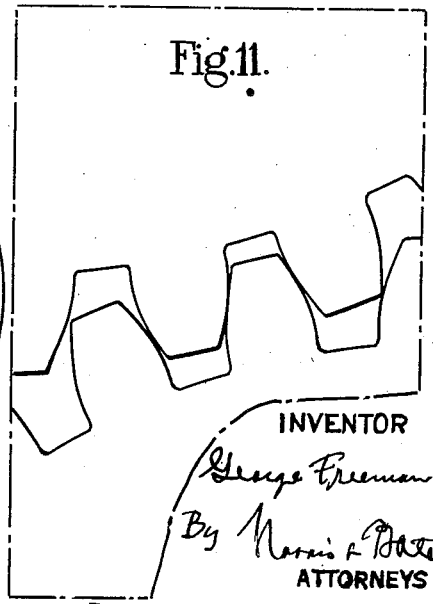

Instead of a single lamp and condenser lens as shown in Figs. 1 to 3 and Fig. 4 and reflecting surfaces, two separate lamps and condenser lens systems may be employed one for the production of each beam $B^1$ and $B^2$. Moreover, the reflecting systems $e^1$ and $e^2$ may be arranged between the wheel and the projection lenses in which arrangement a single projector lens common to both beams may be employed. Further as shown in Fig. 10 the two portions $a^1$, $a^2$ of the wheel A need not be diametrically opposite one another but can be at any desired position on the periphery of the wheel.

Figure 5:
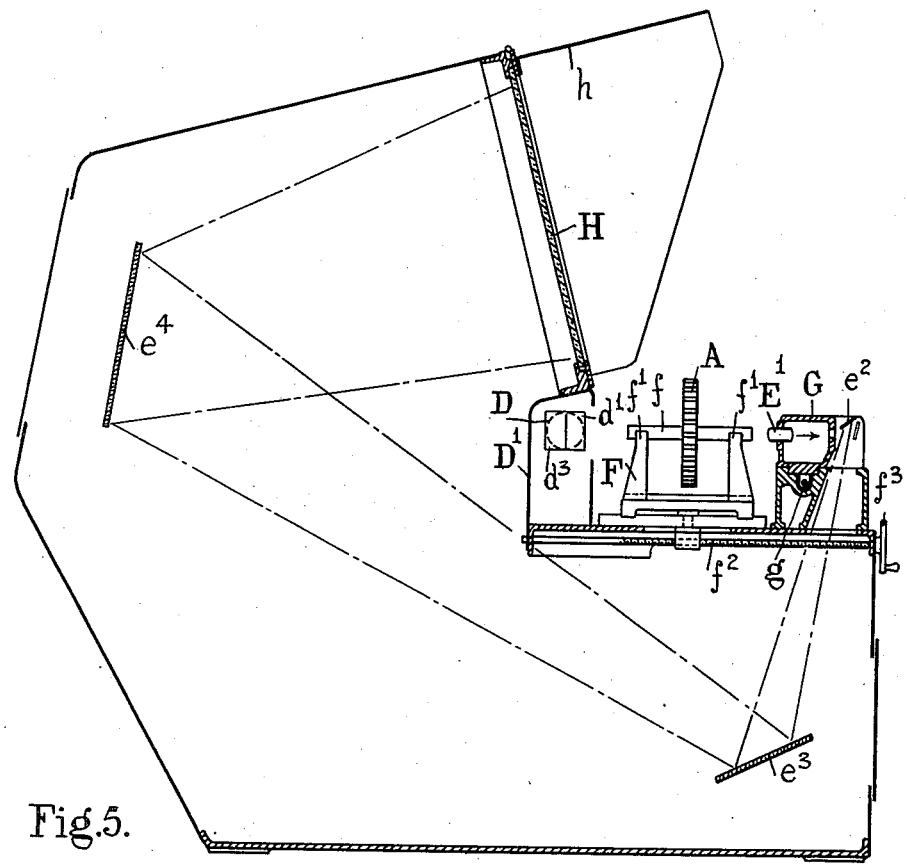
Fig. 5 is a vertical section of a machine embodying the arrangement of condenser lens and reflecting surfaces in Fig. 4, with the projecting lenses and reflecting surfaces shown in Figs. 1 to 3.

Fig. 5 illustrates diagrammatically one form of machine for carrying out the invention. In this machine the wheel A is carried by a spindle $f$ mounted in bearings $f^1$ in which it can be rotated and the bearings $f^1$ are supported by a carriage F capable of longitudinal movement by the screw $f^2$ and operating handle $f^3$. Each projector lens $E^1$ or $E^2$ and the corresponding reflecting surface system $e^1$ or $e^2$ is carried by a housing G slidably mounted so as to be movable transversely by the screw $g$. The lamp D is arranged in a housing $D^1$ at the side of the wheel and the reflecting surfaces $d^1$ and $d^3$ are located in the housing $D^1$ and are movable transversely therein. The images of the portions $a^1$, $a^2$ of the wheel are reflected by the reflecting systems $e^1$, $e^2$ onto the reflecting surface $e^3$ and from this surface onto the viewing screen H by the surface $e^4$. The screen H is preferably a ground glass screen provided with a hood $h$.

By suitable adjustment of the carriage F, the projecting lens $E^1$ and $E^2$ in the housing G, the housing G and the reflecting surfaces $d^1$ and $d^3$, the apparatus can be employed for checking and examining wheels within a predetermined range of diameters.

The reflecting systems $e^1$ and $e^2$ are capable of independent adjustment relative to each other to bring the images of the portions $a^1$ and $a^2$ into the correct positions on the screen H according to the particular portion of the teeth of the wheel which it is desired to check and examine.

Thus when it is desired to check and examine the outer diameter of the wheel A the apparatus is adjusted until the periphery of the images $a$ of the teeth are in contact as shown at 6 in Fig. 6. The wheel is then rotated tooth by tooth and if the diameter is correct the images $a$ of each pair of teeth will contact as at 6 in Fig. 6. Should the diameter be incorrect however there will either be a gap between the outer periphery of the images of the teeth or the images will overlap forming a darker portion indicated by the part $6^a$ in Fig. $6^a$.

To check and examine the pitch diameter of the teeth of the wheel A the apparatus is adjusted until the images $a$ of the teeth are in mesh as shown in Fig. 7. The wheel is then rotated tooth by tooth and if the pitch diameter is correct the images of each pair of teeth will mesh correctly and will appear as in Fig. 7. Should the pitch diameter be too large however the sides of the images $a$ of the teeth will overlap forming darker portions $7^a$ as shown in Fig. $7^a$ whilst if the pitch diameter is too small gaps $7^b$ as shown in Fig. $7^b$ will be seen between the meshing sides of the teeth. Further if there is an error of pitch one side of the images $a$ will overlap forming a dark portion as shown at 9 in Fig. 9 and a gap $9^a$ will appear between the other sides.

To check and examine the root diameter of the teeth of the wheel A the apparatus is adjusted until the images of the teeth overlap to an extent to bring the surfaces at the roots into contact as shown at 8 in Fig. 8. The wheel is then rotated tooth by tooth and if the root diameter is correct the images of each pair of teeth will always appear as shown in Fig. 8. If the root diameter is too large however the surfaces at the roots will overlap forming a darker portion as shown at $8^a$ in Fig. $8^a$ whilst if the root diameter is too small a gap will appear between the two surfaces at 8.

From the foregoing description of the method of checking and examining the teeth of a gear wheel it will be understood how the method is applied to the checking and examining the concentricity or eccentricity of other objects.

I claim:

1. Apparatus for examining or checking the concentricity or amount of eccentricity of the teeth of spur or other gear wheels comprising bearings for supporting a gear wheel for rotation on its axis, a source of light, a condenser lens and system of reflecting surfaces for directing two parallel beams of light longitudinally of the axis of the gear wheel and onto two peripheral sections of the gear wheel, a separate projector lens in the path of each beam beyond the peripheral sections of the gear wheel, and a second series of reflecting surfaces comprising two systems one of which contains one more reflecting surface than the other whereby the images of two peripheral sections of the gear wheel are projected onto a screen in side by side relationship with one image reversed in relation to the other, the gear wheel being rotatable in its bearings to bring successive pairs of sections of its periphery into the parallel beams from the lamp and condenser lens.

2. Apparatus for examining or checking the concentricity or amount of eccentricity of an object comprising bearings for supporting an object for rotation, a source of light, a condenser lens and system of reflecting surfaces for directing two parallel beams of light longitudinally of the axis of rotation of the object and onto two peripheral sections of the object, a separate projector lens in the path of each beam beyond the peripheral sections of the object, a second series of reflecting surfaces comprising two systems one of which contains one more reflecting surface than the other whereby the images of two peripheral sections of the object are projected on a screen in side by side relationship with one image reversed in relation to the other, the object being rotatable in its bearings to bring successive pairs of sections of its periphery into the parallel beams from the lamp and condenser lens, an adjustable carriage for the bearings supporting the object, a housing for each projector lens and corresponding system of reflecting surfaces and means for adjusting said housing transversely in relation to the axis of rotation of the object whereby the apparatus can be adjusted for the examination and checking of objects of different diameters.

3. The method of examining and checking the teeth of gear wheels, which comprises projecting image beams from two non-adjacent sets of teeth of the gear wheel and directing said beams onto a screen to produce thereon profile images of said sets of teeth in side by side relation with one of the images reversed relatively to the other image and the teeth of the images in mesh and to cause the images to move in the same direction on the screen when the gear wheel is rotated, and rotating the gear wheel on its axis to bring images of successive sets of teeth thereon onto the screen to cause the teeth of the images to mesh properly when the teeth of the gear wheel are correct and to overlap or be spaced apart when the teeth of the gear wheel are incorrect.

4. The method of examining and checking the teeth of gear wheels, which comprises projecting image beams from non-adjacent sets of teeth of the gear wheel and directing said beams onto a screen to produce thereon profile images of said sets of teeth in side by side relation with one of the images reversed relatively to the other beam and the peripheral faces of the teeth of the images in contact, and to cause the images to move in the same direction on the screen in response to rotation of the gear wheel, and rotating the gear wheel on its axis tooth by tooth past said beams to bring the images of said teeth successively onto the screen and cause the peripheral surfaces of the profile images thereof to contact when the teeth of the gear wheel are correct and to overlap or be spaced apart when the teeth of the gear wheel are incorrect.

5. The method of examining and checking the teeth of gear wheels, which comprises projecting image beams from non-adjacent sets of teeth of the gear wheel and directing said beams onto a screen to produce thereon profile images of said sets of teeth in side by side relation with one of the images reversed relatively to the other image and the root faces of the teeth of the images in contact and to cause the images to move in the same direction on the screen in response to rotation of the gear wheel, and rotating the gear wheel on its axis tooth by tooth to bring the images of said teeth successively onto the screen and cause the root faces of the profile images thereof to contact when the teeth of the gear wheel are correct and to overlap or be spaced apart when the teeth of the gear wheel are incorrect.

6. Apparatus for examining or checking the concentricity or eccentricity of a circular object, comprising means for supporting the object for rotation, a screen, means for directing two parallel beams of light longitudinally of the axis of rotation of the object onto two peripherally spaced sections of the object, means including systems of reflecting surfaces one of which contains one more reflecting surface than the other system for directing said beams onto the screen to produce thereon images of said sections of the object in adjacent side by side relation with one of the images reversed relatively to the other image, the object being rotatable on its axis to bring images of successive sections thereof onto the screen by movement of said images in the same direction thereon.

7. Apparatus for examining or checking the teeth of gear wheels, comprising means for supporting the gear wheel for rotation on its axis, a screen, means for projecting image beams from two peripherally spaced toothed sections of the gear wheel in directions parallel to the axis of rotation thereof, means including systems of reflecting surfaces positioned to receive the respective image beams and to project them onto the screen to produce thereon images of said sections in adjacent side by side relation, one of said systems having one more reflecting surface than the other system whereby the images projected onto the screen will be relatively reversed with the teeth of the images in mesh and to cause the images to move in the same direction on the screen in response to rotation of the gear wheel on its axis.

GEORGE FREEMAN.